Oct. 17, 1933.  H. L. MUELLER  1,931,153
METHOD OF MAKING FRAME RINGS
Filed July 22, 1931
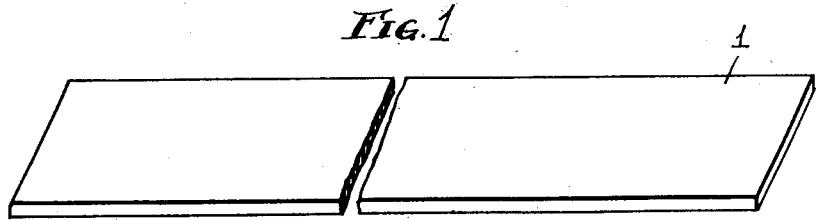
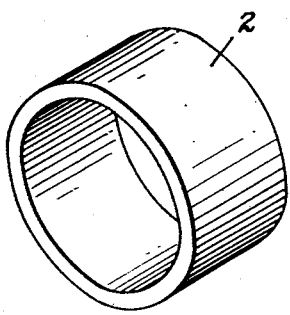
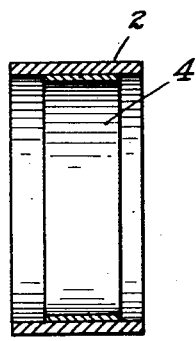
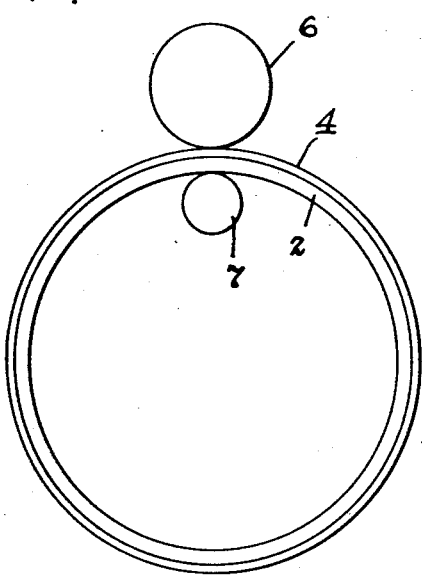
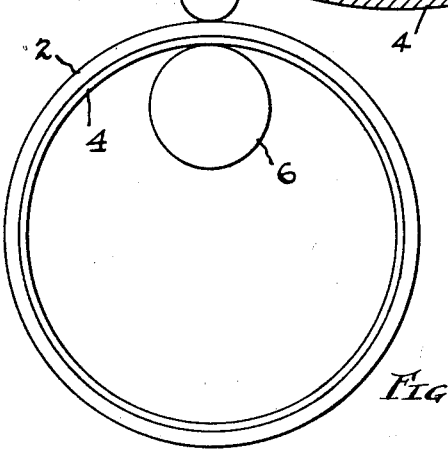
INVENTOR.
Homer L. Mueller
BY
Fay, Oberlin & Fay
ATTORNEYS.

Patented Oct. 17, 1933

1,931,153

UNITED STATES PATENT OFFICE 1,931,153

METHOD OF MAKING FRAME RINGS

Homer L. Mueller, Lakewood, Ohio, assignor to The Cleveland Welding Company, Cleveland, Ohio, a corporation of Ohio Application July 22, 1931. Serial No. 552,367

2 Claims. (Cl. 29—155.53)

This invention relates, as indicated, to the fabrication of metallic articles and refers more specifically to the method of assembling a plurality of annular bands such as are commonly employed in the construction of dynamo electric machines.

As is well known to those familiar with the art, certain apparatus such as dynamo electric machines require an annular frame which is for numerous reasons thicker and accordingly stronger in local annular areas, and in order to reduce the cost of manufacture of such ring frame members, it has been customary in the past to provide a plurality of continuous bands of suitable material and of such diameters that one may be positioned within the other and secured to the inner periphery thereof to build up the proper frame having the desired reinforced local annular areas.

One marked disadvantage incidental to the aforesaid method of fabrication of such annular frame members has been that regardless of the pressure brought to bear one against the other of such members, certain local areas of the juxtaposed surfaces of the bands will not be in proper contact. This is especially harmful and undesirable in the construction of frames for dynamo electric machines where the frame proper is utilized as a magnetic core. In dynamo electric machine frames, therefore, it is essential that the annular bands fabricated to produce the finished frame be in intimate contact through the entire extent of their juxtaposed faces.

As is well known to those familiar with the art, one method heretofore employed for the purpose of securing together concentric annular bands into a fabricated unitary structure has been to assemble the same while at different temperatures so that as the several elements are brought to the same temperature, there will be a differential in expansion and contraction securing one member to another. This method, however, has the same disadvantages which have been enumerated above and which are very objectionable in the construction of frame rings for apparatus such as dynamo electric machines.

It is among the objects of my invention to provide a method of assembling annular bands into a unitary or fabricated structure in which the juxtaposed faces of such bands shall be in intimate contact throughout their entire extent. Other objects of my invention will appear as the description proceeds.

To the accomplishment of the foregoing and related ends, said invention, then, consists of the means hereinafter fully described and particularly pointed out in the claims, the annexed drawing and the following description setting forth in detail certain mechanism embodying the invention, such disclosed means constituting, however, but one of various mechanical forms in which the principle of the invention may be used.

In said annexed drawing:—

Fig. 1 is a broken perspective view of a blank which may be utilized for the production of one of the elements of the fabricated structure; Fig. 2 is a broken perspective showing a blank similar to Fig. 1 but designed to produce another of the elements of the fabricated structure; Fig. 3 is a perspective view of the blank in Fig. 1 after the same has been circularized; Fig. 4 is a perspective view of the blank shown in Fig. 2 after the same has been circularized; Fig. 5 is a transverse sectional view of a fabricated annular frame member; Fig. 6 is a fragmentary transverse sectional view through a portion of the fabricated structure showing the areas of separation between the inner and outer elements; Fig. 7 is a fragmentary sectional view, similar to Fig. 6, illustrating the arrangement of the elements after the employment of the method comprising my invention; and Figs. 8 and 9 are side elevational views showing alternative arrangements of annular bands being united by the method comprising my invention.

Referring now specifically to the drawing and more especially to Figs. 1 and 2, it will be noted that the particular fabricated frame illustrated in the drawing and chosen for purposes of illustration consists of an outer and inner annular band, preferably of different thicknesses and different axial extents, so that the finished article will have a local annular thickened area. In Fig. 1 is illustrated a blank 1 which is preferably formed of stock of suitable thickness and cut to the desired length so that the same may be circularized into the annular band 2 most clearly illustrated in Fig. 3. The method employed for circularizing the blank is believed to be so well known to those familiar with the art that a description thereof is unnecessary. Suffice it to say that suitable forming rolls may be employed in order to produce a substantially circular blank and then the abutting edges may be welded together to make a continuous band. The blank 3 illustrated in Fig. 2, which is preferably of different width and thickness than the blank 1 illustrated in Fig. 1 is in the manner specified likewise formed into a continuous annular band 4 most clearly illustrated in Fig. 4.

After the two blanks have been formed into annular rings, they are nested as most clearly shown in Fig. 5. In this connection it will be noted that, as hereinafter more fully explained, the method comprising my invention is applicable regardless of the relationship between the thickness and width of the several bands employed to produce the resultant fabricated structure. For purposes of convenience it will be assumed that the outer band is thicker and wider than the inner band.

In order to render more efficient the method comprising my invention, it may be desirable to heat or chill one band or the other before the same are brought into the position illustrated in Fig. 5 so that as the several bands are brought to the same temperature, the contraction of the one or expansion of the other will at least superficially unite the same due to such contraction or expansion.

When one band is heated or chilled and the other band chilled or heated and the two bands after being nested are brought to the same temperature regardless of the differential in expansion or contraction ordinarily relied upon to secure together such annular band, it will be found that as most clearly illustrated in Fig. 6, there will be certain voids or pockets 5 occurring between the two layers of metal which are due to inequalities in the juxtaposed faces or surfaces of the several parts.

In order to bring the juxtaposed faces of the several bands into intimate contact throughout their entire extent and in order to produce a finished fabricated article having the desirable characteristics such as strength and uniform electrical permeability, I propose to subject the nested bands to a rolling operation such as is clearly illustrated in Fig. 8. The method for securing together the two nested bands comprising my invention consists in passing the assembled bands through paired aligned rollers of different diameters, depending of course upon the thickness of the stock being operated upon. When the thinner band is on the inside and the heavier band is on the outside, the roller 6 having the largest diameter will contact with the inner periphery of the fabricated structure and the smaller roller 7 will contact with the outer periphery.

When the thick and thin bands are reversed so that the thin band will be on the outside, as illustrated in Fig. 7, then the roller 6 having the largest diameter will contact with the outer periphery of the fabricated shell and the smaller roller 7 will contact with the inner periphery.

The action of this rolling operation which produces the desirable results may be defined as follows: The larger roller being maintained in contact with the thinner shell will be in contact therewith throughout an area which is considerably greater than the area of contact between the smaller rolls 7 and the thick shell. In other words, since the rolls 6 and 7 are pressed against the shells with equal force, the pressure per unit area on the thinner shell will be less than the pressure per unit area on the thicker shell, with the result that the degree of metallic deformation will be equally proportioned in each metal section. Accordingly, as the fabricated band is passed between the rollers, the metal of the thicker shell and the metal of the thinner shell on the juxtaposed faces will be suitably worked so as to eliminate all of the pockets such as 5 which ordinarily occur when the two bands are assembled by shrinking one upon the other.

Briefly summarizing the principles comprising my invention, it is believed that the same resides in the provision of a suitable supporting means such as a roller of large diameter for the thinner of the bands to be fabricated and then working the thicker band by means such as a roller having a diameter smaller than the supporting roller for the thin band. When the fabricated bands are rolled in the manner described, it will be found that the pockets, such as 5, will be entirely eliminated. It may be necessary for certain types and sizes of material to pass the ring or fabricated annular structure through the working rolls for a plurality of successive passes before the desired results are achieved. Nevertheless, if the stock worked upon is within reasonable limits of thickness, it will be found that the desired ends are attained by only a very few passes.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:—

1. The method of assembling a pair of annular bands of different thicknesses, which consists in arranging such bands one within the other, and subjecting the inner and outer peripheries of each band to a rolling action, the rolling pressure exerted per unit area on each periphery being proportionate to the respective thicknesses of said bands.

2. The method of assembling a pair of annular bands of different thicknesses, which consists in arranging such bands one within the other, rolling the thicker band under relatively heavy pressure per unit area, and rolling the thinner band under relatively lighter pressure per unit area.

HOMER L. MUELLER.